May 31, 1938.  F. MARASSO  2,119,017
COMBINED DOUGH DIVIDER AND ROUNDER
Filed Dec. 11, 1936   2 Sheets-Sheet 1
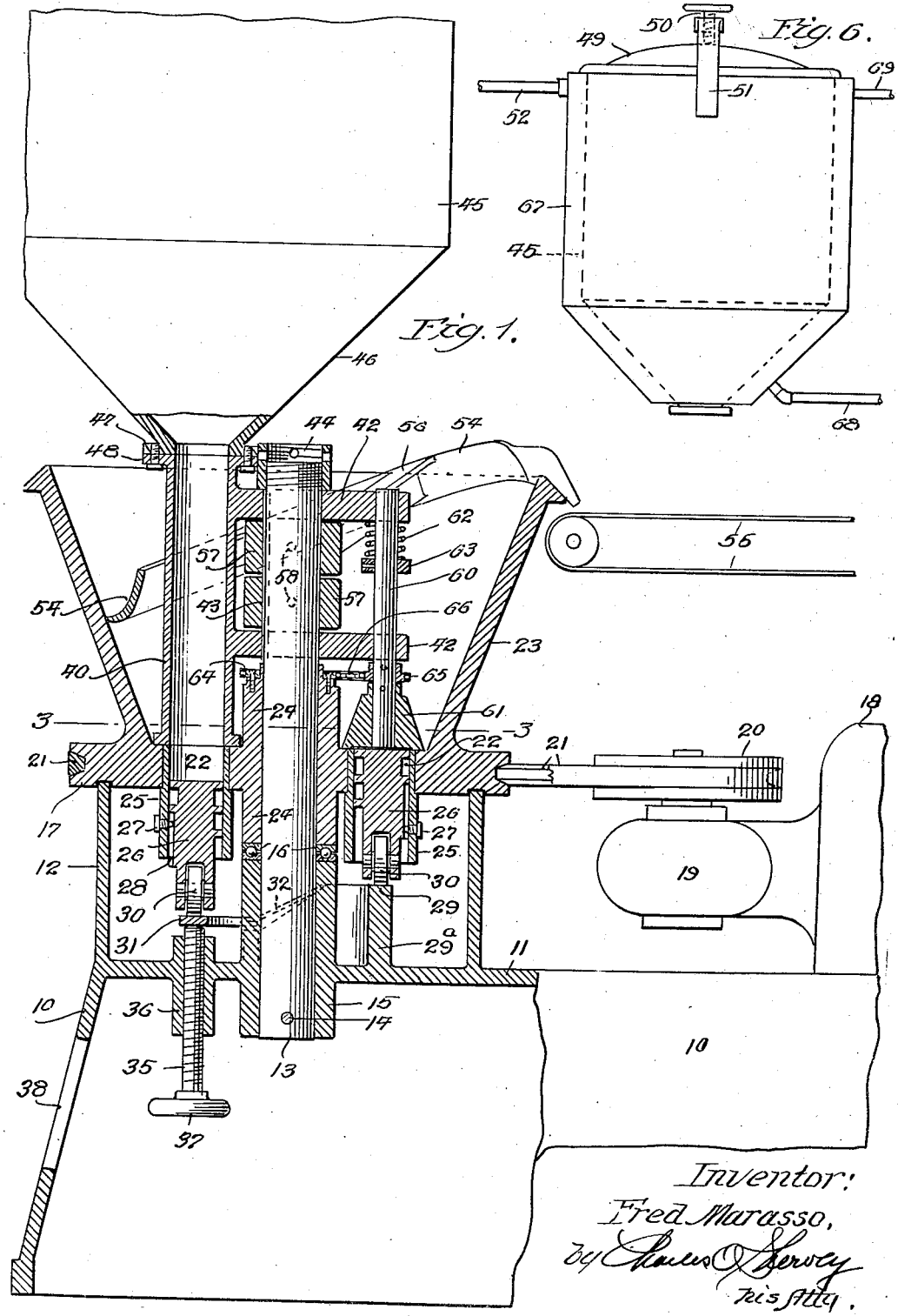
Inventor:
Fred Marasso,
by Charles J. Hervey
his Atty.

May 31, 1938.　　　　F. MARASSO　　　　2,119,017
COMBINED DOUGH DIVIDER AND ROUNDER
Filed Dec. 11, 1936　　2 Sheets-Sheet 2
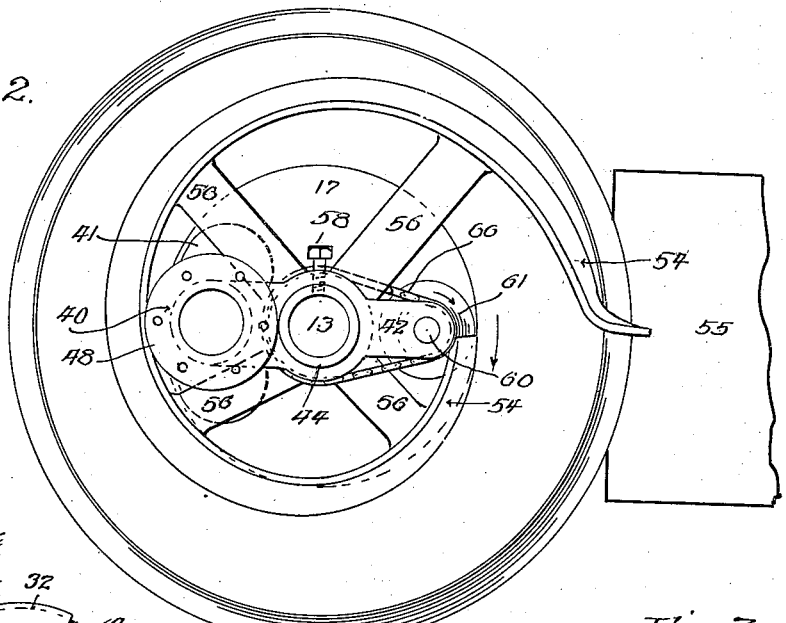
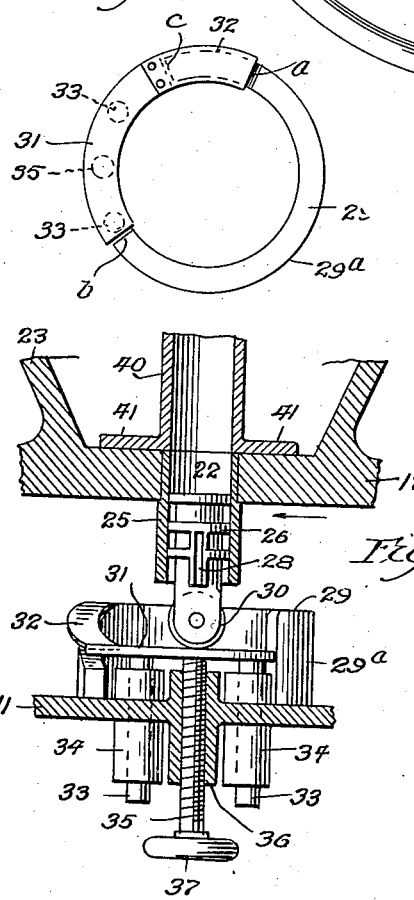
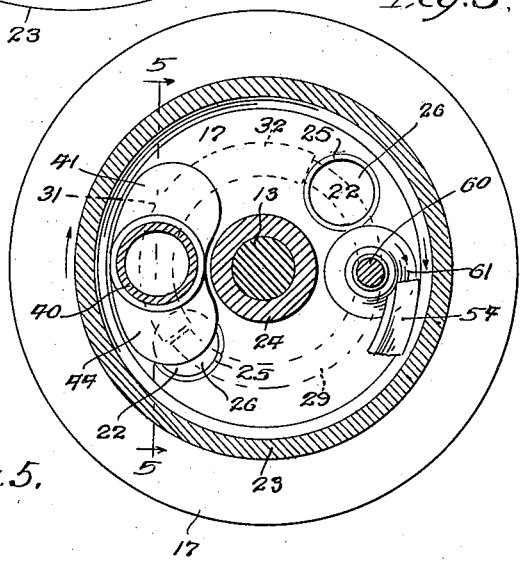
Inventor:
Fred Marasso,
by Charles O. Hervey
his Atty.

Patented May 31, 1938

2,119,017

UNITED STATES PATENT OFFICE 2,119,017

COMBINED DOUGH DIVIDER AND ROUNDER

Fred Marasso, Joliet, Ill., assignor to Union Machinery Company, Joliet, Ill., a corporation of Illinois Application December 11, 1936, Serial No. 115,331

11 Claims. (Cl. 107—4)

This invention relates to combined dough dividers and rounders.

One of the objects of this invention is to provide, in a single machine, means for measuring and dividing a batch of dough into lumps, and to round up the measured lumps of dough into balls of dough. Heretofore separate machines have been employed to divide or measure dough and to round up the dough lumps and this necessitated a motor or other power means for each machine, separate drive mechanism, separate bases and a conveyor for conveying the measured dough lumps from the divider to the rounder. Furthermore, additional floor space was required for the two machines and the conveyor.

In accordance with the present invention, the batch of dough is divided into measured lumps by the machine, which are then delivered directly to the rounding up mechanism of the machine without any interposed conveyor. Moreover, one and the same element serves the two functions of carrying measuring pockets and a rounding-up wall, which is sometimes in the form of a cylinder or the frustum of a cone and sometimes in the form of a bowl of inverted frusto-conical form. The invention has been illustrated in connection with the last mentioned type of rounding-up wall.

In accordance with another phase of the invention, the dough is delivered under pressure to the measuring pockets and when used in forming relatively large dough lumps, means are provided for preventing the batch of dough from heating.

In accordance with another phase of the invention, means are provided to facilitate the initial action of the rounding-up means on the dough lumps delivered from the measuring pockets to the rounding-up means.

Another object is to provide a combined dough divider and rounder of simple and substantial construction and capable of increased capacity, whereby a greater number of pieces of dough can be effectively handled in less time than heretofore.

With the above mentioned objects and other objects and advantages in view, this invention consists in dough rounding-up means having dough dividing means arranged to deliver measured lumps of dough directly to the rounding-up means.

The invention further consists in a combined dough divider and rounder having a common support for the measuring pockets and the rounding-up wall, and means to deliver the measured lumps of dough directly to the rounding-up wall.

The invention further consists in the several novel features hereinafter fully set forth and claimed.

One embodiment of the invention is clearly illustrated in the drawings accompanying this specification, in which:

Fig. 1 is a view, partly in side elevation and partly in vertical, central longitudinal section, of a combined dough divider and rounder, certain parts being broken away to enable the view to be made as large as possible upon the sheet;

Fig. 2 is a plan of the rounding-up mechanism, with the dough container removed;

Fig. 3 is a detail, horizontal section, taken on the line 3—3 of Fig. 1, showing the measuring pockets in a different position;

Fig. 4 is a detail plan of a track which is employed for actuating the plungers of the dividing mechanism;

Fig. 5 is a fragmental, vertical cross-section taken on the line 5—5 of Fig. 3; and Fig. 6 is a side elevation of the dough container showing an additional feature.

In the combined dough divider and rounder illustrated, the reference character 10 designates the base of the machine upon which the mechanism is mounted. Extending from the top wall 11 of the base is a cylindrical housing wall 12, in the center of which is an upright stationary shaft or post 13, rigidly secured by means of a pin 14 in a hollow boss 15 formed on the top wall of the base.

Rotatively mounted on the shaft or post 13, as by anti-friction bearings 16, is a rotary carrier or table 17, which is driven from a suitable power device, such as an electric motor 18 mounted on the base. Usually the motor is provided with speed reducing gearing 19 which drives a belt pulley 20. The table 17 may serve as a belt pulley and is driven from the belt pulley 20 by a belt 21, which desirably is in the form of a V-belt, running in V-grooves in the peripheries of the table 17 and pulley 20. The form of drive mechanism described is immaterial to the invention and is chosen merely for the purpose of illustration. The table 17 serves to support several measuring pockets 22, in which the dough is measured and divided into lumps, and said table also serves as a support for the rounding-up wall 23, which is here shown as comprising the wall of a bowl of inverted frusto-conical form, the table 17 forming the bottom of the bowl. Desirably the table 17 and the rounding-up wall 23 may be cast integral. The table is formed with centrally disposed hollow bosses 24, which extend up and down from the table and surround the shaft or post 13, whereby to steady the rounding-up bowl while being rotated. The pockets 22 may be formed of sleeves 25 rigidly held in openings in the table, and desirably said sleeves may be cylindrical and project downward from the lower side of the table. Sliding in the pockets formed by the sleeves are plungers 26, which form the bottoms of the pockets, and said plungers are kept from turning in the pockets by screws 27 that are threaded in the sleeves 25 and engage in upright grooves 28 formed on the external faces of the plungers.

I have shown two measuring pockets, but it is to be understood that the table may be provided with any desirable number of measuring pockets.

In the operation of the machine, the plungers are lowered from an up position in which their upper faces are flush with the upper face of the table, as shown at the right in Fig. 1, to a down position, which determines the capacity of the pockets, this latter position being shown at the left in Fig. 1. Means are provided for raising the plungers from their down position to their up position, for the purpose of ejecting the measured dough lumps from the pockets. The means illustrated will now be described.

Extending up from the top wall 11 of the base is a segmental flange 29ª, which is concentric with the shaft or post 13. The upper edge of said flange provides a track section 29 upon which travel rollers or wheels 30 that are rotatively mounted in forked downward extensions of the plungers. Between the points indicated by the reference characters a, b, (Fig. 4) the track section 29 is horizontal and is properly spaced from the upper face of the table so that when the rollers run on said horizontal track section the upper faces of the plungers will be held flush with the upper face of the table. From the point indicated by the character, a, to the point indicated by the character, c, the track section 29 slopes downwardly, and between the points b, c, is a vertically adjustable, segmental track section 31, which occupies a lower level than the track section 29 between the points a, b, so as to permit the plungers to fall to and occupy their down position while traveling along the track section 31. A thin flexible sheet metal, segmental plate 32 is fastened to the track section 31 and lies upon the inclined part of the track section 29. The three track sections 29, 31, 32 provide a circular track upon which the rollers 30 run and by means of which the plungers are permitted to fall to their down position and are raised to their up position.

Desirably the track section 31 is mounted upon posts 33 which are guided in hollow bosses 34 formed on the top wall of the base, and an adjustment screw 35, threadedly mounted in a hollow, internally threaded boss 36 formed on the top wall 11, engages the under side of the track section 31 and provides means for adjusting the same vertically. A hand wheel 37 on the lower end of the adjustment screw 35 provides means for manipulating the adjustment screw, and a hand hole 38 is formed in the side wall of the base to permit access to the hand wheel. As is customary, indicating means may be provided in connection with the adjustment screw for indicating the capacity of the measuring pockets.

Mounted upon the shaft or post 13, above the table 17, is a feed chute 40, the lower face of which contacts with the upper face of the table 17 and said chute is formed at its lower edge with a flange 41, which extends along and contacts with the upper face of the table. The purpose of the flange 41 is to prevent any dough from leaking out between the feed chute 40 and the table during the passage of the pockets past the feed chute. Desirably the feed chute is supported from the shaft 13 and, as shown, has supporting arms 42 projecting therefrom which encircle the shaft 13 and are keyed thereto with a key 43 so as to hold the feed chute 40 stationary. A collet 44 threadedly mounted upon the upper end of the shaft 13 bears upon the upper face of the uppermost arm 42 and serves to hold the lower face of the feed chute in intimate contact with the upper face of the table.

Secured to the upper end of the feed chute is a dough container 45 having a hopper-like bottom 46, which is flanged as at 47 and bolted to a flange 48 formed on the upper end of the feed chute.

The dough container has a cover 49 (see Fig. 6) which makes an air tight joint with the top of the container and may be fastened to the container by a screw 50 threaded in a yoke 51 fastened to the container. A pipe 52, connected to an air compressor or other source of compressed air, opens to the interior of the container, and supplies pressure to the batch of dough contained therein, whereby the same is fed down through the feed chute to the measuring pockets.

Co-operating with the rounding-up wall 23 is a spiral mold board 54 of conventional form, which contacts with the inner face of the rounding-up wall and extends along the same from the table to the top of the bowl. The rounding-up face of the bowl and the spiral mold board form a spiral trough through which the lumps of dough are rolled upward from the table to the discharge end of the trough, rounded up in the customary manner and discharged upon a conveyor belt 55, by which they are conveyed to another machine for a subsequent operation. The mold board is provided with a number of supporting arms 56 which extend toward and are formed upon hubs 57 that are rigidly fastened to the shaft 13 by the key 43 and by screws 58 or otherwise. The operation of the rounding-up means is common and well known and requires no further description, so far as this specification is concerned.

Rotatively supported in the arms 42 is an upright shaft 60 which carries upon its lower end a conical or tapered feed roll 61, the flat bottom of which contacts with the upper face of the table 17. For the purpose of holding the feed roll 61 in intimate contact with the table, a coiled compression spring 62 is provided between the uppermost arm 42 and a collar 63 secured upon the shaft 60.

The feed roll 61 is rotated in the same direction as the direction of rotation of the rounding up wall 23 and at about the same speed. The means illustrated for rotating the feed roll 61 comprises a sprocket wheel 64 rigidly mounted on the upstanding boss 24, a sprocket wheel 65 rigidly mounted on the shaft 60, and a sprocket chain 66 trained around said sprocket wheels. The rounding-up face of the mold board 54, at its lower end, is parallel with and leads away from the sloping face of the feed roll 61 and the latter acts to start the dough lumps up the inclined spiral trough. Fig. 3 shows the table 17 in a position in which the plunger for one of the pockets for a measured dough lump has been raised to the level of the top face of the table and just before the dough lump encounters the feed roll. The rotating table carries the dough lump to and presses it against the feed roll and the latter moves the dough lump toward the inclined rounding-up wall 23 and together, with said wall, instantly starts the dough lump up the spiral trough. The feed roll itself commences the act of rounding up the dough lump and the rounding-up wall and mold board continue and complete the rounding up action on the dough lump. Furthermore it will be seen that the dough lump when leaving the plunger which has ejected it from the pocket, continues to move in the same general direction in which the plunger carried it, and is only deviated slightly from this path by the feed roll and then is rolled around and up the spiral trough. In other words, the dough lump is not abruptly thrown off the table. This is objectionable as it is then likely to hesitate slightly before continuing its movement and this is likely to cause "doubles", namely, two dough lumps are likely to become stuck together and rolled up as one. The feed roll positively starts the dough lump up the spiral trough the instant it contacts with it and positively eliminates "doubles". Heretofore some difficulty has been encountered in starting the dough lump up the trough, but with the addition of the feed roll this difficulty has been entirely eliminated.

The machine as illustrated is intended for rounding-up small dough lumps in the manufacture of buns and the like, but the size of the machine may be increased to handle larger dough lumps in the manufacture of bread. With a larger machine, it is desirable to prevent the batch of dough in the container from heating and this may be done by providing a water jacket 67 around the container 45, as is illustrated in Fig. 6. Water or other cooling medium may be circulated through the jacket 67, and pipes 68, 69 are shown connected with the jacket for conveying the cooling medium to and away therefrom.

In the operation of the machine a batch of dough is placed in the container 45 and the lid 49 is fastened down thereon. Air pressure is then admitted to the container through the supply pipe 52 and the machine is started. As the table 17 revolves, the measuring pockets pass underneath the feed chute 40, at which place dough is forced down into the pocket thereunder, the plunger for this pocket at this time being in its down position with the roller 30 running upon the track section 31. As the table revolves, the roller rides upon the part 32 of the track section 31 to the highest part of the track section 29, thereby bringing the upper face of the plunger flush with the upper face of the table 17. As the table revolves, it carries the measured dough lump into engagement with the feed roll 61 which frictionally engages the dough lump commences to round it up and moves it against the sloping rounding-up wall 23, and as it passes between said wall and the feed roll the two positively propel the dough lump into the trough and the rounding-up wall, rolls it up to the top thereof, rounding it up, and discharging it upon the conveyor belt 55.

As the top face of each plunger passes the roll 61 any possible dough that may cling thereto is scraped therefrom. As the table revolves, carrying the plunger past the feed roll, the plunger is carried by the segmental section 29 of the track until it reaches the end thereof, indicated by the reference character, b, in Fig. 4, whereupon the plunger drops and the roller then travels upon the lower track section 31. As seen in Fig. 3, the plunger does not drop until it has passed underneath the flange 41 of the feed chute and it remains under the flange until the pocket has again been filled with dough and has moved beyond the discharge opening in the feed chute. This arrangement prevents any of the dough from possibly being squeezed out between the table and the feed chute.

To change the capacity of the pockets, the adjustment screw 35 is turned up or down as the case may be.

From the above it is apparent that the plungers eject the measured dough lumps from the pockets into a position to be directly acted upon by the rounding-up wall, thereby eliminating the necessity of any conveyor between a divider and rounder, and furthermore, saving the time necessary to convey dough lumps between two such machines. Ordinarily dough lumps are dropped into the rounder from above, but it is to be observed that in the present case the dough lumps are delivered directly to the bottom of the rounding-up wall.

More or less variation of the exact details of construction is possible without departing from the spirit of this invention. I desire, therefore, not to limit myself to the exact form of the construction shown and described, but intend, in the following claims to point out all of the invention disclosed herein.

I claim as new and desire to secure by Letters Patent:

1. A combined divider and rounder comprising in combination a rotating carrier having several measuring pockets therein, reciprocating plungers in the pockets, and a dough rounding-up wall, coacting rounding-up means cooperating with said rounding-up wall to round up lumps of dough, a stationary feed chute having a stationary discharge end contacting with the carrier and disposed in the path of travel of the pockets, said feed chute serving to deliver dough directly into the pockets, and plunger lifting means operating to raise each plunger and discharge the dough from its associated pocket before said pocket, and the dough discharged therefrom reaches the coacting rounding-up means, whereby the rotating carrier conveys the discharged lump of dough to the said coacting rounding-up means and rounding-up wall.

2. A combined divided and rounder, comprising in combination a rotary carrier, comprising a bottom wall and a dough rounding-up wall rising therefrom, a shaft upon which the carrier rotates, a stationary spiral mold board stationarily mounted on said shaft and co-operating with said dough rounding-up wall to round up lumps of dough, a measuring pocket opening through said bottom wall, a feed chute stationarily mounted on said shaft and having a discharge end contacting with the bottom wall of the carrier, said feed chute being arranged to deliver dough into said pocket, under pressure, while the pocket is passing the discharge end of the feed chute, and means to move the dough from the pocket to a position to be acted upon by the rounding-up wall and the mold board.

3. In a combined divided and rounder, the combination of a rotary table having measuring pockets therein, a stationary feed chute having a discharge end contacting with the table and arranged to deliver dough to said pockets, a rounding-up wall projecting up from said table, a stationary spiral mold board co-operating with said rounding-up wall to round up lumps of dough, ejecting plungers in said measuring pockets arranged to eject measured lumps of dough therefrom directly to the rounding-up means, and means to actuate the plungers.

4. In a combined dough divider and rounder, the combination of a rotatory table having measuring pockets therein, a single stationary feed chute having a discharge end contacting with the table and from which dough is directly delivered to said pockets, under pressure, a rounding-up wall extending up from said table, a stationary spiral mold board co-operating with said rounding-up wall to form a trough in which lumps of dough are rounded up, plungers in said pockets and forming the bottoms thereof, and an annular track having track sections arranged at different levels and adapted to actuate said plungers, whereby to deliver mesured lumps of dough to the trough formed by the rounding-up wall and mold board.

5. In a combined divider and rounder, the combination of a rotatory table having measuring pockets depending therefrom and opening out through the upper face thereof, a single stationary feed chute having a discharge end contiguous with the upper face of the table and disposed above the path of travel of said pockets, whereby to discharge a quantity of the material into a pocket when the latter registers with the discharge end of the feed chute, dough ejecting plungers reciprocating in said pockets and forming the bottoms thereof, means to raise said plungers to thereby bring their upper faces flush with the upper face of the table, an annular dough rounding-up wall extending up from said table, and a stationary spiral mold board extending from the upper face of the table to the top of the dough rounding-up wall and co-operating therewith to round up lumps of dough discharged from the pockets.

6. In a combined divider and rounder, the combination of a rotatory table having measuring pockets depending therefrom and opening out through the upper face thereof, a single stationary feed chute having a discharge end contiguous with the upper face of the table and disposed above the path of travel of said pockets, whereby to discharge a quantity of the material into a pocket when the latter registers with the discharge end of the feed chute, dough ejecting plungers reciprocating in said pockets and forming the bottoms thereof, means to raise said plungers to thereby bring their upper faces flush with the upper face of the table, an upwardly and outwardly flaring dough rounding-up wall extending up from said table, and a stationary spiral mold board extending from the upper face of the table along the internal face of the dough rounding-up wall and co-operating therewith to round up lumps of dough discharged from said pockets.

7. In a combined divider and rounder, the combination of a rotatory table having measuring pockets therein, a feed chute, through which dough is delivered to said pockets under pressure, a rounding-up wall extending up from said table, a stationary spiral mold board co-operating with said rounding-up wall to form a spiral trough in which lumps of dough are rounded up, a feed roll arranged to be encountered by dough lumps ejected from the pockets and adapted to move said dough lumps into engagement with the rounding-up wall at the entrance to said trough, means for rotating said feed roll in the same direction as the direction of movement of the rounding-up wall, plungers in said pockets, and means for actuating said plungers.

8. In a combined divider and rounder, the combination of a rotatory table having measuring pockets therein, a feed chute for delivering dough to said pockets under pressure, a rounding-up wall extending up from the table, a stationary spiral mold board co-operating with said rounding-up wall to form a trough in which lumps of dough are rounded up, a conical feed roll co-operating with said rounding-up wall to feed lumps of dough, that are ejected from said pockets, to the trough, means for rotating the feed roll in the same direction as the direction of movement of the rounding-up wall, plungers in said measuring pockets, and means to actuate said plungers.

9. In a combined divider and rounder, the combination of a rotatory table having measuring pockets therein, a feed chute, through which dough is delivered to said pockets under pressure, a rounding-up wall extending up from said table, a stationary spiral mold board co-operating with said rounding-up wall to form a spiral trough in which lumps of dough are rounded up, a feed roll arranged to be encountered by dough lumps ejected from the pockets and adapted to move said dough lumps into engagement with the rounding-up wall at the entrance to said trough, sprocket wheel and chain gearing between the rotating table and feed roll for rotating said feed roll in the same direction as the direction of movement of the rounding-up wall, plungers in said pockets, and means for actuating said plungers.

10. A combined divider and rounder, comprising in combination a rotatory table having a plurality of measuring pockets therein and a dough rounding-up wall, stationary, coacting rounding-up means co-operating with said rounding-up wall to round up lumps of dough, a feed chute for delivering dough to said pockets, a plunger in each pocket arranged to eject the dough therefrom, plunger actuating means, and a feed roll associated with said co-operating rounding-up means and disposed in the path of movement of the dough lumps carried on the plungers of the rotating table, said feed roll co-operating with said rotating table to initiate the rounding-up of the dough lumps.

11. A combined divider and rounder, comprising in combination a rotatory table having a measuring pocket therein and a dough rounding-up wall, a stationary spiral mold board co-operating with said dough rounding-up wall to round up lumps of dough, a stationary feed chute having a discharge end contacting with the table and disposed in the path of travel of the pocket, said feed chute serving to deliver dough directly into said pocket, a plunger to eject the lump of dough from the pocket, and a rotating feed roll co-operating with the rotating table to move the lump of dough against the dough rounding-up wall.

FRED MARASSO.